Nov. 17, 1925.
C. H. KNIGHT
1,561,649
SETWORKS FOR SAWMILLS
Filed June 26, 1925    5 Sheets-Sheet 5
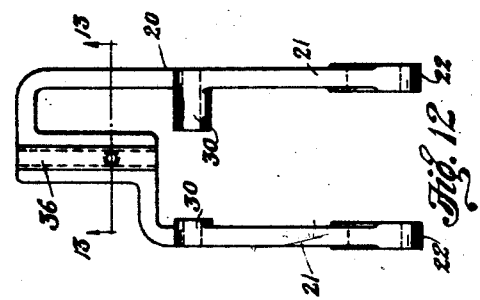
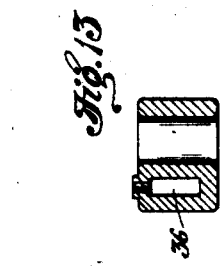
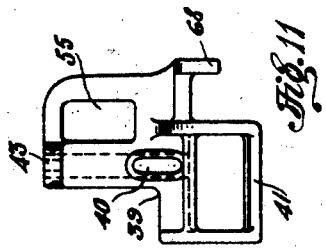
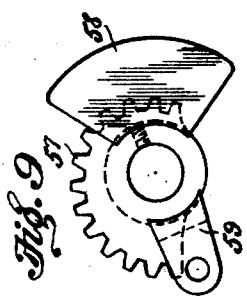
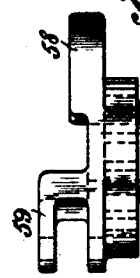
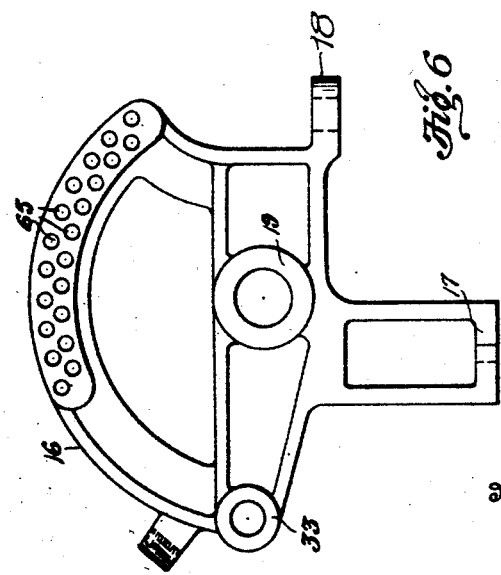
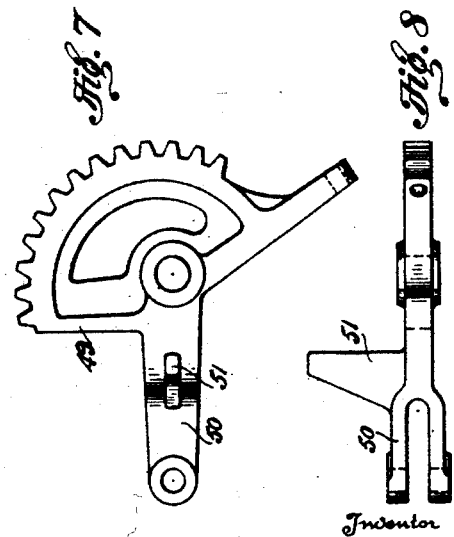
Inventor
C. H. Knight
By Freose and Bond
Attorneys Patented Nov. 17, 1925.

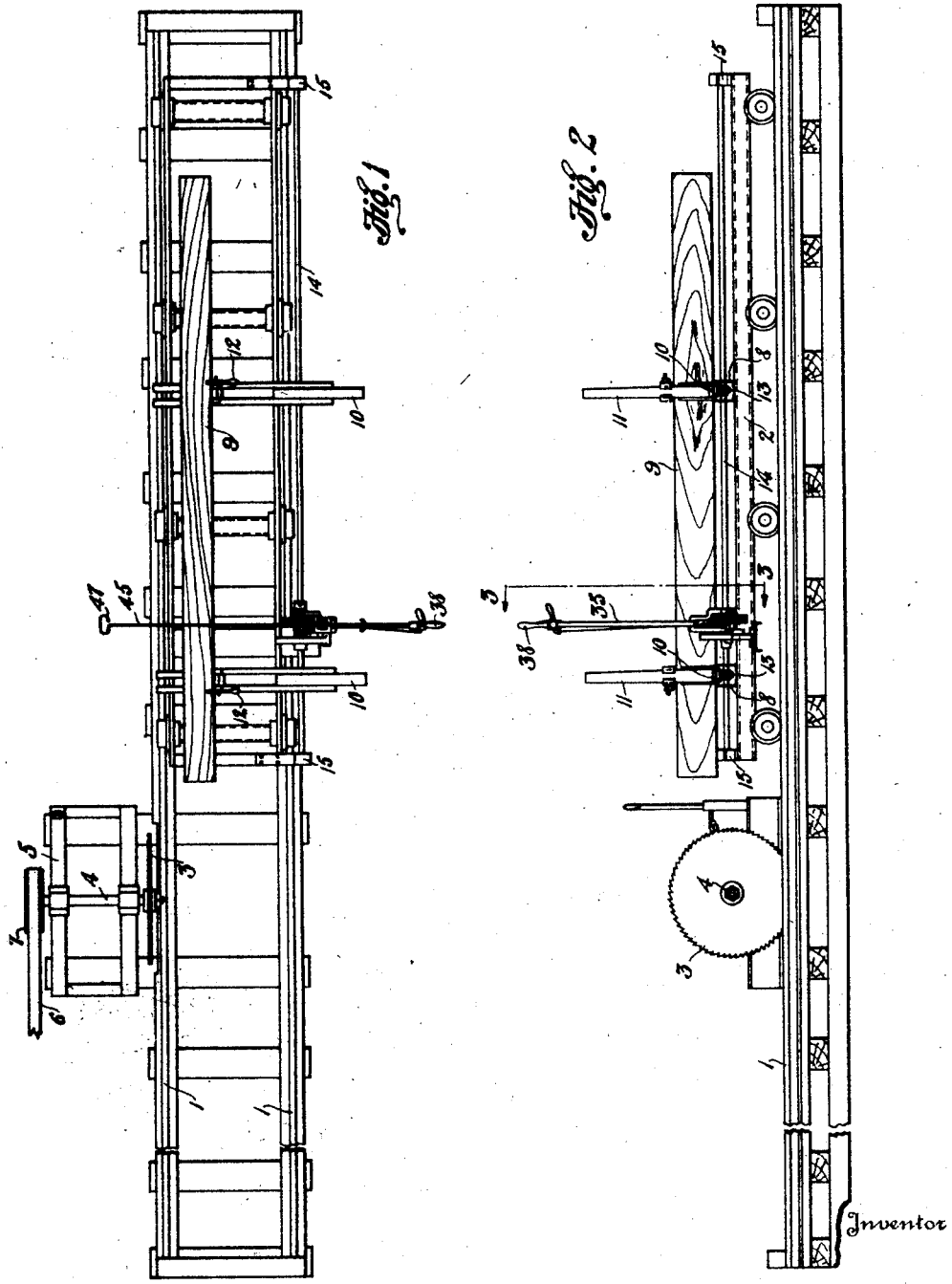

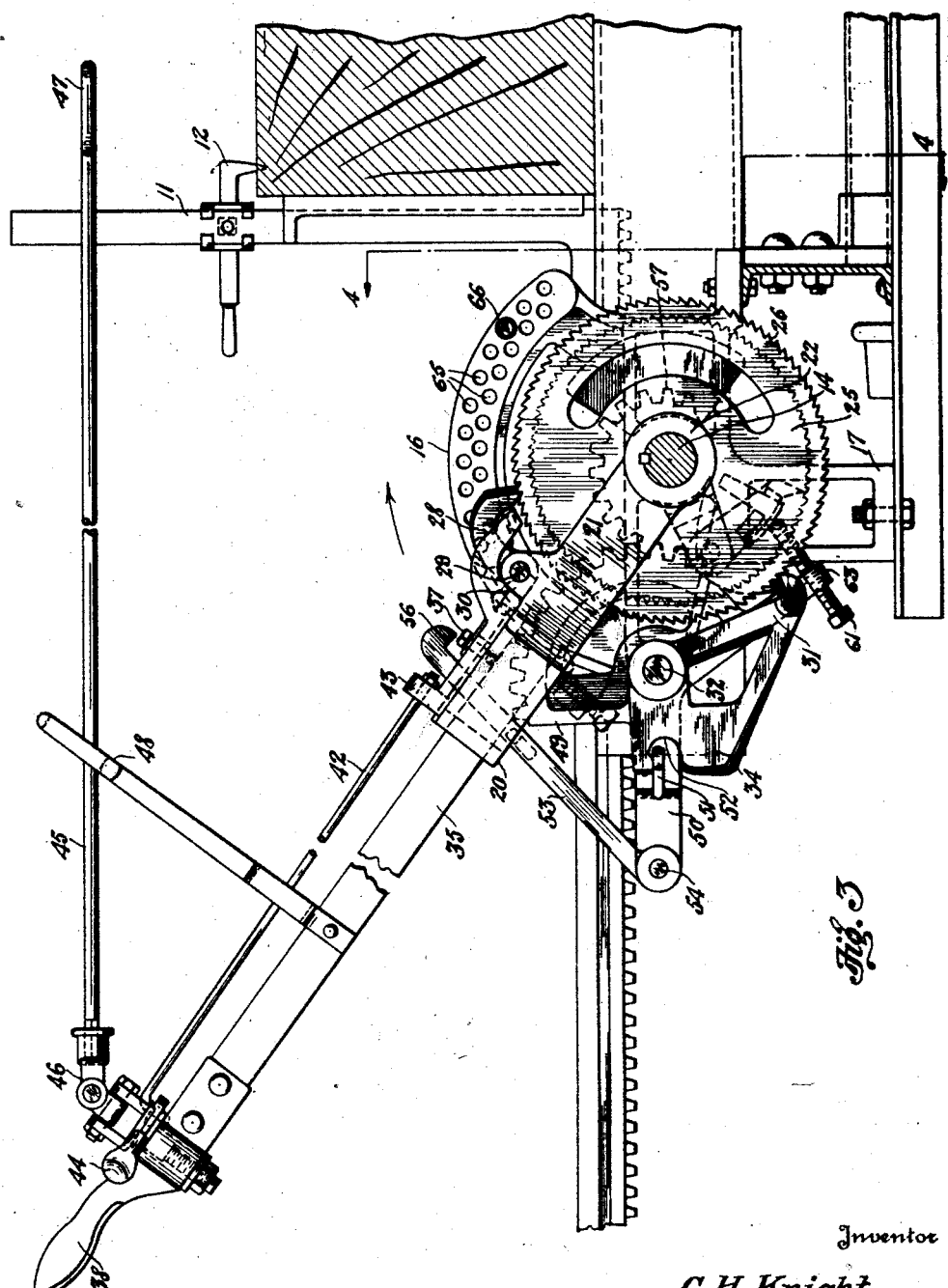

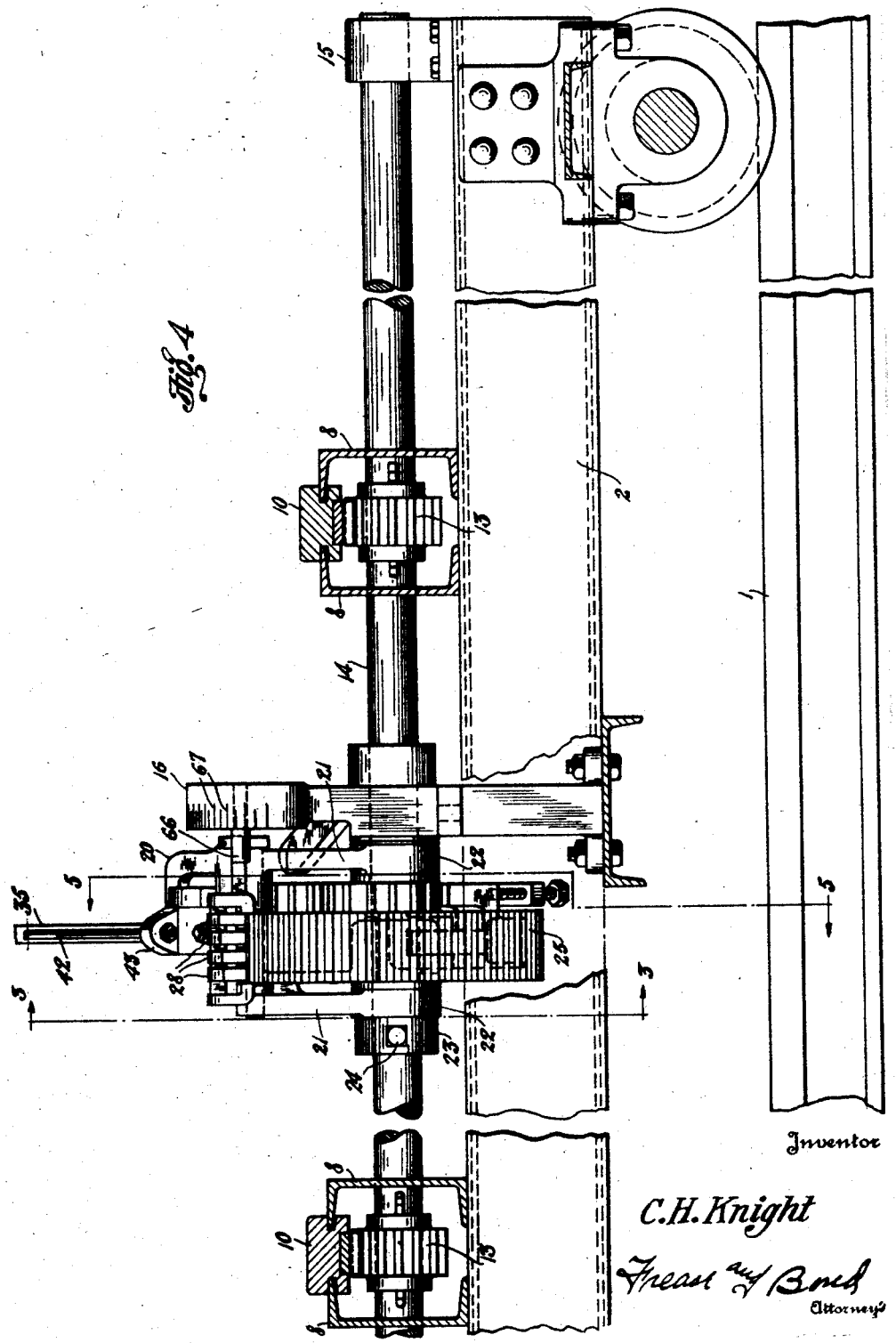

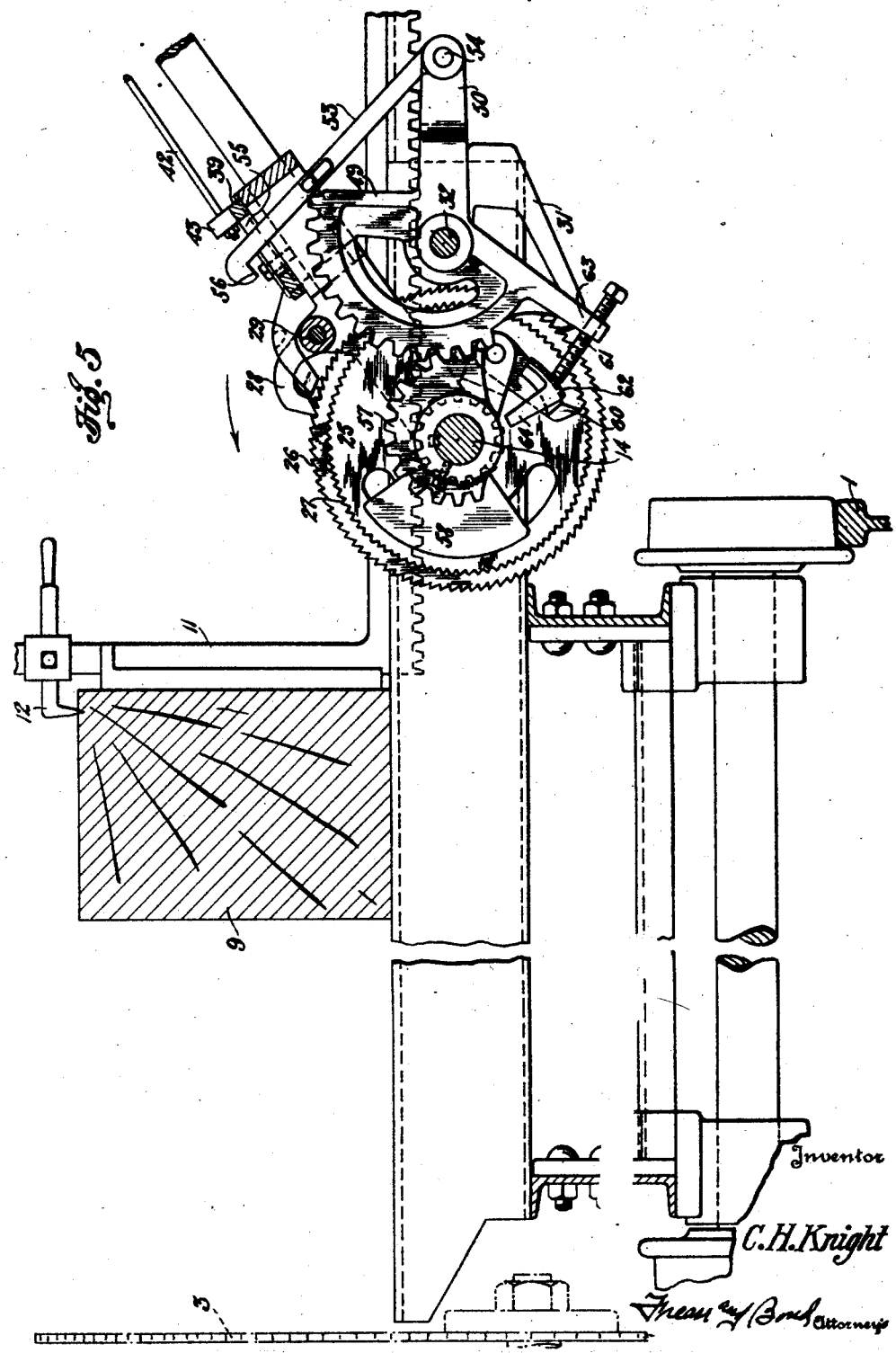

1,561,649

UNITED STATES PATENT OFFICE.

CHARLES H. KNIGHT, OF CANTON, OHIO.

SETWORKS FOR SAWMILLS.

Application filed June 26, 1925. Serial No. 39,685.

*To all whom it may concern:*

Be it known that I, CHARLES H. KNIGHT, a citizen of the United States, residing at Canton, in the county of Stark and State of Ohio, have invented certain new and useful Improvements in Setworks for Sawmills, of which the following is a specification.

This invention relates to saw mills wherein the timbers to be sawed are clamped upon a carriage arranged to be moved with reference to a circular saw adapted to cut the timber; and the objects of the invention are to provide a set works for moving the timber transversely of the carriage and positioning the same to cause the saw to cut a piece of any desired width from the timber; a special reversing mechanism being provided for moving the timber clamping means back to normal position, after the sawing operations.

An embodiment of the invention is illustrated in the accompanying drawings, in which, Figure 1, is a plan view of a saw mill provided with the improved mechanism;

Fig. 2, a side elevation of the same;

Fig. 3, an enlarged section on the line 3—3, Figs. 2 and 4;

Fig. 4, a section on the line 4—4, Fig. 3;

Fig. 5, a section on the line 5—5, Fig. 4;

Fig. 6, a detail elevation of the arch frame;

Fig. 7, a side elevation of the elliptic quadrant;

Fig. 8, an edge elevation of the same;

Fig. 9, a side elevation of the elliptic pinion;

Fig. 10, an edge elevation of the same;

Fig. 11, an elevation of the sliding pawl trip;

Fig. 12, an elevation of the yoke, and

Fig. 13, a section on the line 13—13, Fig. 12.

Similar numerals of reference indicate corresponding parts throughout the drawings.

Saw mills of the general character to which the invention relates include a track 1 upon which is mounted a carriage 2 arranged to be moved longitudinally upon the track by any well known means, such as a cable or the like (not shown).

A circular saw 3 is mounted upon a shaft 4 journaled in bearings carried by a stationary frame 5 located at one side of the track, the shaft 4 being arranged to be rotated by any usual and well known means such as the belt 6 connected to the drive pulley 7, upon the shaft, and arranged to be driven by any suitable source of power.

A pair of transversely located channel members 8 are mounted upon the carriage to slidably support the timber 9 to be sawed. A rack bar 10 is slidably mounted in each channel and provided at its inner end with an upright post 11 against which the timber is placed, a hook 12 being carried by said post and arranged to engage the upper surface of the timber to hold the same against movement with reference to the posts.

Each of the rack bars 10 meshes with a pinion 13 fixed upon a shaft 14 located longitudinally of the carriage and journaled in bearings 15 mounted upon the opposite side thereof to the saw.

The mechanism to which the present invention pertains includes the arch frame 16 which is rigidly connected to the carriage and may be provided with the depending foot 17 and lug 18 for bolting or otherwise attaching the frame to the carriage, a bearing 19 being provided in said arch frame to receive the shaft 14.

The yoke 20 is provided with spaced legs 21 having bearing portions 22 at their extremities, which are journaled upon the shaft 14 between the arch frame and the collar 23 fixed upon the shaft as by a set screw 24 or the like.

The ratchet wheel 25 is keyed upon the shaft 14, between the legs of the yoke and provided with the peripheral ratchet teeth 26 and the inner ratchet teeth 27. A plurality of pawls 28, of progressively increasing length, are independently pivoted upon a cross bar 29 supported at its ends in the bearing portions 30 of the yoke. These pawls are of such relative length that one of the same is always substantially in position to engage one of the outer ratchet teeth regardless of the position of the yoke, and the pawls rest by their own weight upon the periphery of the ratchet wheel.

A plurality of holding pawls 31 are independently pivoted upon the shaft 32 which is carried in the bearing portion 33 of the arch frame, said pawls having the weighted tail portions 34 arranged to hold the pawls by gravity in engagement with the outer ratchet teeth upon the ratchet wheel. These pawls, the same as the pawls 28, are of progressively increasing length whereby one of the pawls is always substantially in position to engage the ratchet teeth 26 to hold the ratchet wheel against rotation in one direction.

The yoke is provided with a handle 35 which may be extended into the tubular portion 36 thereof and rigidly held in place as by a set screw 37, a hand grip 38 being formed upon the upper end of said handle.

The pawl trip 39 is slidably mounted upon the upper end portion of the yoke and may be provided with a longitudinal slot 40 which receives the set screw 37. A yoke portion 41 of the pawl trip surrounds the pawls 28 and is arranged to lift said pawls out of engagement with the ratchet wheel when the pawl trip is slidably moved upward or outward upon the yoke by means of the link 42 which is connected to the ear 43 of the pawl trip and to the lever 44 adjacent to the hand grip portion of the handle 35.

In order that the pawl trip may be operated from the opposite side of the carriage, a rod 45 is connected to the lever 44 as by the universal joint 46 and extended in a substantially horizontal position to the opposite side of the carriage, and provided at its outer end with a hand grip 47, said rod being normally supported in a horizontal position by means of a fork 48 carried by the handle 35.

An elliptic quadrant 49 is journaled upon the shaft 32 and provided with an outwardly extending radial arm 50 having a horizontal lug 51 extended into notches 52 in the weighted tail portions of the holding pawls 31.

A hook 53 is pivoted as at 54 to the outer end of the arm 50 and extends through the slot 55 in the pawl trip, the shank of said hook resting upon the upper or outermost tooth of the elliptic quadrant 49, thus holding the hooked end 56 out of the path of the pawl trip, when the same is in the normal position as shown in Figures 3 and 5, permitting the yoke to be oscillated without engaging the hook.

The elliptic pinion 57 is journaled upon the shaft 14 and meshes with the elliptic quadrant 49, a weighted sector 58 being connected to one side of said pinion to normally urge the same and the quadrant into the position shown in Figures 3 and 5.

A radial arm 59 is formed upon the elliptic pinion and has pivoted thereto a pawl 60 for engagement with the inner teeth 27 upon the ratchet wheel and normally held out of engagement therewith by the set screw 61 which engages the arcuate portion 62 of the pawl, said set screw being carried by a depending arm 63 of the elliptic quadrant. To prevent the pawl 60 from falling inward away from the ratchet teeth, beyond a limited position, a stop finger 64 may be provided upon the inner side of the pawl.

The arch frame 16 is provided with a series of apertures 65, which represent the fractional parts of an inch in movement of the rack bars 10 and posts 11, to which the timber is attached, and a removable stop pin 66 may be selectively placed in any of said openings. The peripheral surface of the arch frame is preferably graduated as indicated at 67 to indicate the movement of the rack bars permitted with each adjustment of the pin 66. A stop lug 68 may be provided upon the pawl trip for engagement with the stop pin 66, to limit the throw of the yoke 20.

In operating the mechanism, the timber as shown at 9 is placed against the posts 11 and the hooks 12 thereon are engaged in the upper surface of the timber. The stop pin 66 is placed in the desired opening 65 in the arch frame and with the parts in the position as shown in Figures 3 and 5 the hand grip 38 of the handle 35 is grasped and the handle oscillated in the direction of the arrows shown in said figures. The yoke is of course oscillating in the same direction, through the movement of the handle, and the pawls 28 thereon engaging the outer teeth upon the ratchet wheel 25 rotate the same and with it the shaft 14 in the same direction. As the stop lug 68 engages the pin 66 the movement of the yoke in this direction is stopped. The yoke is then thrown back to the initial position and with each movement of the same in the direction of the arrows, the timber is advanced the desired distance to permit the saw 3 to cut a plank of the desired thickness therefrom.

In order to reverse the movement of the rack bars 10, after the timber has been cut, to bring the posts 11 back to the initial position, the lever 44 is operated to slidably move the pawl trip 39 upward or outward upon the yoke, raising the pawls 28 out of engagement with the ratchet wheel. With the parts in this position, as the yoke is rotated in the direction of the arrows shown in Figures 3 and 5, the hook 56 will be engaged by the pawl trip 39 rotating the elliptic quadrant in the same direction and through the lug 51, lifting the holding pawls 31 out of engagement with the ratchet wheel. The elliptic pinion 57 will be rotated through the elliptic quadrant, and as the pawl 60 is disengaged from the set screw 61 it will engage the inner ratchet teeth 27 upon the ratchet wheel, rotating the shaft 14 in a direction to move the rack bars 10 back toward the normal position.

Owing to the relative contours of the elliptic quadrant and elliptic pinion it will be seen that at the beginning of each reverse movement considerable power is produced, and after the rack bars are started backward the movement of the same will be more rapid, thus providing for quick reversing movement in order to bring the parts back to the initial position to receive another timber.

I claim:

1. In a sawmill set-works, a shaft, a ratchet wheel fixed thereto, a lever journaled upon the shaft, pawls carried by the lever for engagement with the ratchet wheel, means for moving the pawls out of engagement with the ratchet wheel, an elliptic pinion loosely mounted upon the shaft, a pawl carried by said pinion for engagement with the ratchet wheel, an elliptic quadrant journaled adjacent to the shaft and meshing with the pinion, means upon the quadrant for normally holding the last named pawl out of engagement with the ratchet wheel and means operated by the pawl disengaging means for operatively connecting the quadrant to the lever when said first named pawls are disengaged from the ratchet wheel.

2. In a sawmill set-works, a shaft, a ratchet wheel fixed thereto, a lever journaled upon the shaft, pawls carried by the lever for engagement with the ratchet wheel, means for moving the pawls out of engagement with the ratchet wheel, an elliptic pinion loosely mounted upon the shaft, a pawl carried by said pinion for engagement with the ratchet wheel, an elliptic quadrant journaled adjacent to the shaft and meshing with the pinion, means upon the quadrant for normally holding the last named pawl out of engagement with the ratchet wheel and a hook operated by the pawl disengaging means for operatively connecting the quadrant to the lever when said first named pawls are disengaged from the ratchet wheel.

3. In a sawmill set-works, a shaft, a ratchet wheel fixed thereto, a lever journaled upon the shaft, pawls carried by the lever for engagement with the ratchet wheel, means for moving the pawls out of engagement with the ratchet wheel, an elliptic pinion loosely mounted upon the shaft, a pawl carried by said pinion for engagement with the ratchet wheel, an elliptic quadrant journaled adjacent to the shaft and meshing with the pinion, means upon the quadrant for normally holding the last named pawl out of engagement with the ratchet wheel and means operated by the pawl disengaging means for operatively connecting the quadrant to the lever when said first named pawls are disengaged from the ratchet wheel, and holding pawls normally engaging the ratchet wheel and arranged to be disengaged therefrom when the quadrant is operatively connected to the lever.

4. In a sawmill set-works, a shaft, a ratchet wheel fixed thereto, a lever journaled upon the shaft, pawls carried by the lever for engagement with the ratchet wheel, a sliding pawl trip upon the lever for disengaging the pawls from the ratchet wheel, an elliptic pinion loosely mounted upon the shaft, a pawl carried by said pinion for engagement with the ratchet wheel, an elliptic quadrant journaled adjacent to the shaft and meshing with the pinion, means upon the quadrant for normally holding the last named pawl out of engagement with the ratchet wheel, holding pawls journaled co-axially with the quadrant and having notches in their rear portions, a lug upon the quadrant engaging said holding pawls, and a hook carried by the quadrant and arranged to be engaged by said pawl trip when the same is operated.

In testimony that I claim the above, I have hereunto subscribed my name.

CHARLES H. KNIGHT.